(12) United States Patent
Shiotani

(10) Patent No.: US 7,113,620 B2
(45) Date of Patent: Sep. 26, 2006

(54) IMAGE-QUALITY DETERMINATION METHOD, IMAGE-QUALITY DETERMINATION APPARATUS, IMAGE-QUALITY DETERMINATION PROGRAM

(75) Inventor: Hiroyuki Shiotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/291,426

(22) Filed: Nov. 12, 2002

(65) Prior Publication Data

US 2003/0113021 A1 Jun. 19, 2003

(30) Foreign Application Priority Data

Nov. 16, 2001 (JP) ............................. 2001-351609

(51) Int. Cl.
*G06K 9/00* (2006.01)

(52) U.S. Cl. ...................................... 382/112; 382/218

(58) Field of Classification Search ................ 382/112, 382/218, 203, 254, 209, 181

See application file for complete search history.

(56) References Cited

U.S. PATENT DOCUMENTS

| 5,235,652 | A | * | 8/1993 | Nally ........................ 382/112 |
| 5,712,921 | A | * | 1/1998 | Zabele ...................... 382/112 |
| 5,872,859 | A | * | 2/1999 | Gur et al. .................. 382/128 |
| 6,275,600 | B1 | * | 8/2001 | Banker et al. .............. 382/112 |
| 6,606,395 | B1 | * | 8/2003 | Rasmussen et al. ........ 382/112 |
| 6,639,999 | B1 | * | 10/2003 | Cookingham et al. ...... 382/112 |
| 6,658,139 | B1 | * | 12/2003 | Cookingham et al. ...... 382/112 |

* cited by examiner

*Primary Examiner*—Samir Ahmed
*Assistant Examiner*—John B. Strege
(74) *Attorney, Agent, or Firm*—Fitzpatrick, Cella, Harper & Scinto

(57) ABSTRACT

A read image of an original is compared by using a dictionary in which sample-image information is associated with a score indicating the quality of an image and stored, and the quality score of the read image of the original is calculated; and control is made such that the calculated quality score is presented to the user. Therefore, the quality of an image is evaluated in a stable manner.

18 Claims, 6 Drawing Sheets

IMAGE-QUALITY DETERMINATION METHOD, IMAGE-QUALITY DETERMINATION APPARATUS, IMAGE-QUALITY DETERMINATION PROGRAM

BACKGROUND OF THE INVENTION

1. Field of the Invention

The present invention relates to image-quality determination methods, image-quality determination apparatuses, and image-quality determination programs for evaluating the quality of an image printed on a recording medium by an image forming apparatus, such as a printer, a copier, or an ink-jet printer.

2. Description of the Related Art

It is known that the quality of characters printed in electrophotography deteriorates due to character thickening or thinning caused by how toner attaches, due to scattering of toner fine particles, and due to mechanical vibration.

It is also known that the quality of characters printed in an inkjet method deteriorates due to ink blur, scattering of ink dots, and mechanical vibration when ordinary paper is used instead of special glossy paper.

When an electrophotographic or ink-jet image forming apparatus is developed or manufactured, it is necessary to evaluate the printing quality of the image forming apparatus.

Conventionally, skilled persons visually compare a printed material with a limit sample to evaluate the quality of printed characters and images. In other words, printed materials are conventionally evaluated by the visual sense of human beings.

Date-label-printing inspection apparatuses used in factory production lines only determine whether a product is acceptable or defective (whether characters can be identified or not), that is, determines one of two states, and cannot determine fine quality which falls in a gray area.

In a conventional evaluation performed using the visual sense of human beings, different inspectors may make different determinations, or an inspector may make different determinations for the same thing.

When a small image is evaluated by visual inspection, it is necessary to enlarge the image, and hence expensive equipment, such as an optical microscope or an instant camera system, is required. In addition, if the quality of printed characters needs to be evaluated at 10 locations in one printed material, it is necessary to position the microscope and the printed material, focus the camera, adjust the exposure, and develop and fix the film after capturing an image, 10 times. This is very troublesome.

Further, the date-label-printing inspection apparatuses used in factory production lines only determine whether a product is acceptable or defective, that is, determines one of two states, and cannot be used to determine which printed material has the best image quality among a plurality of printed materials.

SUMMARY OF THE INVENTION

Accordingly, an object of the present invention is to provide an image-quality determination method, an image-quality determination apparatus, and an image-quality determination program for evaluating the quality of a printed image in a stable manner.

The foregoing object is achieved in one aspect of the present invention through the provision of an image-quality determination method that comprises a pattern score calculation step, a basic score calculation step, a score calculation step, and a presenting step in which the results obtained in the first three-mentioned steps are presented. In the pattern score calculation step, a pattern score is calculated by comparing pattern measurement information stored in a pattern dictionary with pattern measurement information measured in a pattern matching processing that compares a image of an original with a sample image. In the basic score calculation step, a basic score is calculated, by using an identification dictionary based on a result of an identification processing that compares a feature vector of the original image with a feature vector of a sample image. In the score calculation step, a quality score of the original image is calculated, using both the calculated pattern score and the calculated basis score.

The foregoing object is achieved in another aspect of the present invention through the provision of an image-quality determination apparatus that comprises a dictionary in which sample-image information is associated with a score indicating the quality of an image and stored, and which comprises a pattern dictionary and an identification dictionary. Pattern score calculation means calculate a pattern score by comparing pattern measurement information stored in the pattern dictionary with pattern measurement information measured in a pattern matching processing that compares an image of an original with a sample image, and basic score calculation means calculate a basic score by using the identification dictionary based on a result of an identification processing that compares a feature vector of the original image with a feature vector of a sample image. Score calculation means calculate a quality score of the original image using both the calculated pattern score and the calculated basis score, and presenting means present the calculated quality score to the user.

The foregoing object is achieved in still another aspect of the present invention through the provision of an image-quality determination program including program code for causing a computer to execute the steps of the method outlined above.

The foregoing object is achieved in yet another aspect of the present invention through the provision of a storage medium readable by a computer having stored thereon such an image-quality determination program.

Further objects, features and advantages of the present invention will become apparent from the following description of the preferred embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the present invention and, together with the description, serve to explain the principles of the present invention.

DESCRIPTION OF THE PREFERRED EMBODIMENTS

Figure 1:
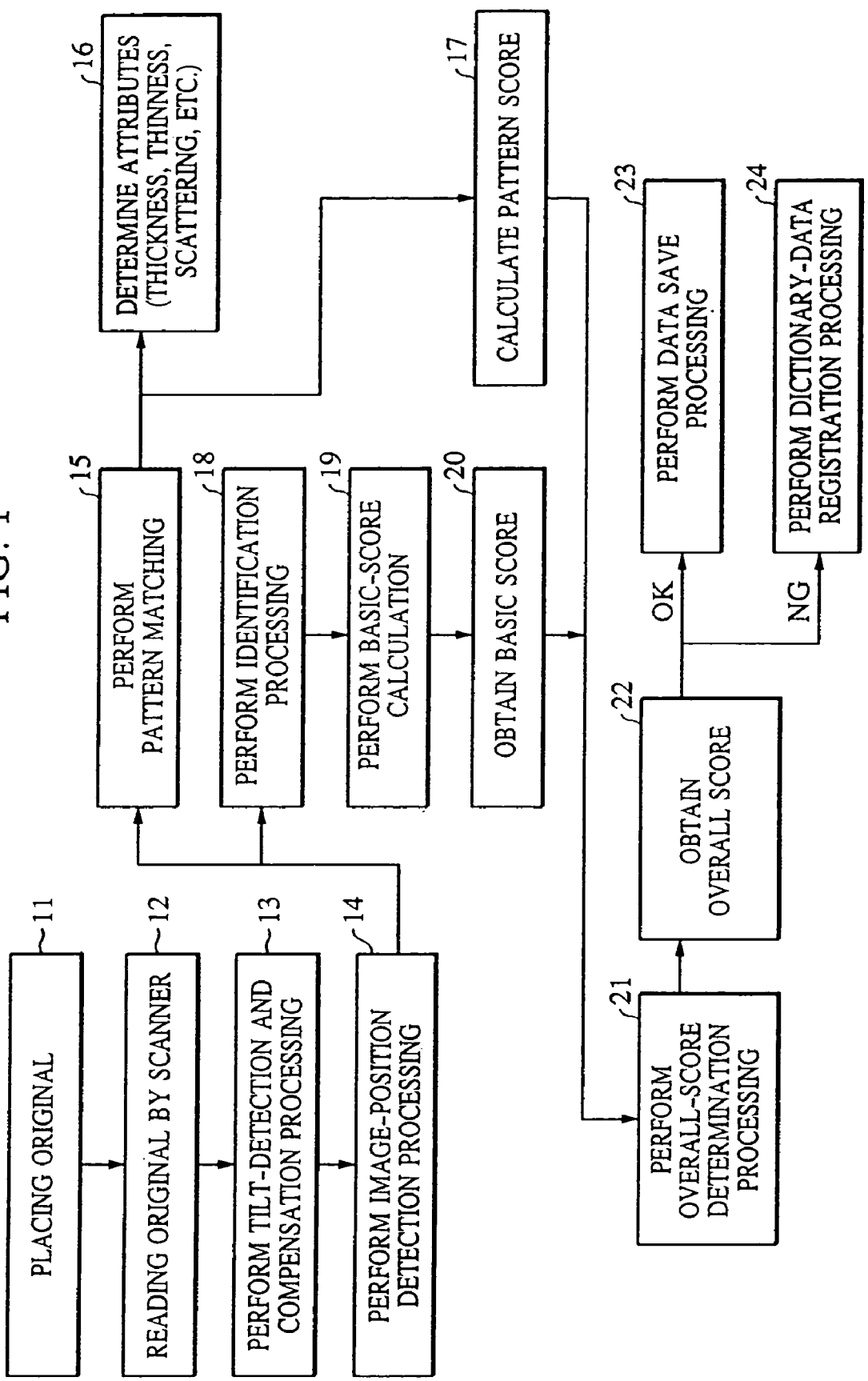
FIG. 1 is a flowchart of quality-determination processing.

FIG. 1 is a flowchart showing an embodiment of the present invention.

In the present embodiment, a case in which a predetermined character image is read from an original 11 and the quality thereof is determined will be described. A predetermined character included in a test sheet serving as an original on which an evaluation image is printed may be evaluated. Alternatively, a predetermined character included in any original may be used. In the present embodiment, it is assumed that a test sheet on which evaluation characters are printed is used, and a Japanese character den, 電, printed on the test sheet is evaluated. However, it should be apparent that the present invention can be used to evaluate other characters, Japanese or otherwise. Since it is possible that printing states differ depending on printing locations when one sheet is used for evaluation, it is preferred that the Japanese character den, 電, should be printed at a plurality of different locations on the test sheet, and the plurality of the characters should be evaluated.

Figure 5:
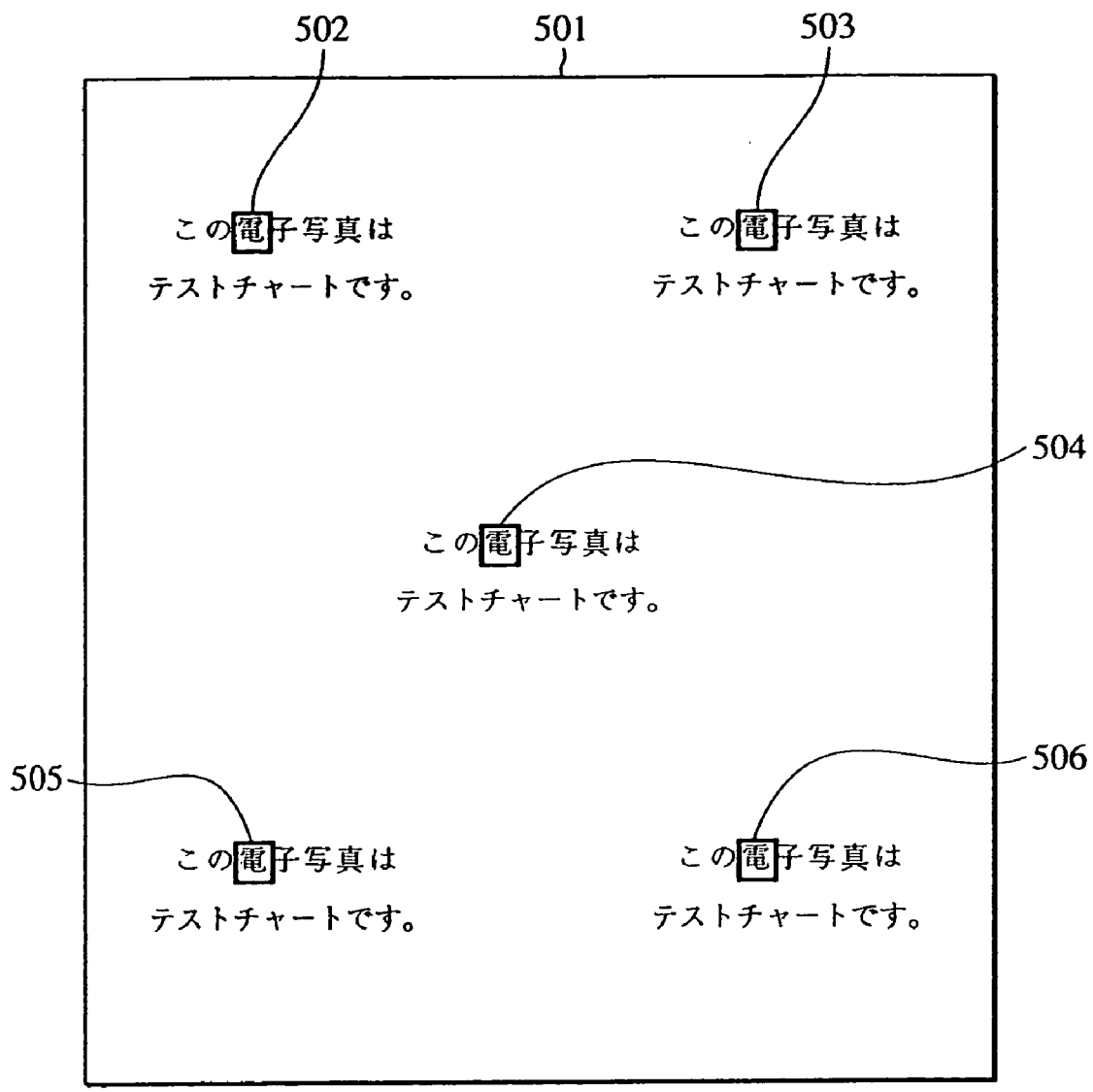
FIG. 5 is a view of an example test sheet.

FIG. 5 shows an example of such a test sheet. On the test sheet 501, character images to be used for quality determination are printed at a plurality of locations. It is assumed here that five character images 502 to 506 of the Japanese character den, 電, are used for evaluation.

Referring again to FIG. 1, a scanner 12 is used to optically read the original 11 to obtain the original image. As discussed above, the original image may be one or more images, and is discussed below, each original image can be evaluated using the present invention.

Then, an operation (not shown) is made on a user-interface screen to call a template for identifying locations where the character images to be evaluated are disposed on the test sheet. An automatic determination button is pressed. With the use of such a template, it is easier to identify the locations of the images to be evaluated.

Tilt-detection and compensation processing 13 replaces the arrangement of a character string of the read sheet image with a straight line to measure the tilt of the string, and, if a tilt is detected, rotates the whole image by the amount of tilt to compensate. A known tilt detection method can be used for detecting any tilt.

Image-position detection processing 14 identifies a rough area in which a desired character image is disposed, using the called template to identify an area, or areas, on the test sheet; the character image in the identified area is then examined by generating a histogram of image data in the area; and, using the histogram, determining whether the character image represents the desired character (e.g., determining whether the image represents the Japanese character den, 電); and, if it is determined that the character image represents the desired character, obtains the character image from the test sheet. A known character recognition technology can be used in examining the character image to determine whether it represents the desired character.

Pattern matching processing 15 generates density-distribution data from the character image extracted from the test sheet in the image-position detection processing 14, and converts the character image to a binary character image according to the density distribution data so as to make the original-data loss of bright portions (white) and dark portions (black) minimum. The pattern matching processing 15 also applies isolated-point removal processing to the binarized character image to obtain a compensated image A, and applies blur removal processing to the binarized character image to obtain a compensated image B. Then, the pattern matching processing 15 uses the binarized character image and the compensated images A and B to compare with a reference pattern (a reference image obtained from font data) to obtain the following measurements (or pattern measurement data): a black-point rate, an excess rate 1, an excess rate 2, an excess clear rate, a lack rate 1, a lack rate 2, and a lack clear rate.

Then, with the use of a pattern dictionary in which the pattern measurement data is associated with attributes (such as thickness, thinness, and scattering) together with pattern scores, and stored in advance for patterns, the attribute 16 corresponding to the pattern measurement data obtained in the pattern matching processing 15 is determined. The pattern measurement data measured in the pattern matching processing 15 is compared with the pattern measurement data stored in the pattern dictionary to calculate a pattern score 17. Details of the pattern matching processing will be described later by referring to FIG. 2.

Identification processing (character recognition processing) 18 extracts density-change information from a multi-value character image, to obtain feature information, which preferably comprises 400 dimensions; uses a pseudo-Bayes' decision function to compare the feature information extracted from the character image with feature information in an identification dictionary to obtain a calculated value (measured by distance, so that the smaller the value is, the more similar they are) indicating similarity; and generates a first candidate to a tenth candidate in ascending order of the magnitude of the calculated values. The identification dictionary is generated in advance by using a great number of learning character images of the Japanese character den, 電. In the identification dictionary, the feature information obtained from each of the learning character images is associated with the score of the learning character image and stored. Therefore, in the identification processing 18, the scores and the calculated values are obtained for the first candidate to the tenth candidate. Details of the identification processing 18 will be described later by referring to FIG. 3.

Basic-score calculation processing 19 compares the score of the first candidate with that of the second candidate both identified in the identification processing 18. When there is a large difference between the scores, since it is highly likely that the character image to be identified matches the first candidate, the score of the first candidate is used as a basic score 20. When there is a small difference between the scores, since whether the character image to be identified matches the first candidate or the second candidate cannot be determined with an error being taken into account, the average of the score of the first candidate and that of the second candidate is used as the basic score 20.

Overall-score determination processing 21 uses the pattern score 17, the basic score 20, the calculated value (similarity) of the first candidate identified in the identification processing 18, and the calculated value (similarity) of an n-th candidate identified in the identification processing 18, which has a score similar to the pattern score 17, to calculate an overall score.

The calculated value of the first candidate is compared with that of the n-th candidate having a score similar to the pattern score 17. When there is a large difference between the calculated values, since the reliability of the basic score 20 calculated in the identification processing 18 is very high, the basic score 20 is used as an overall score 22. When there is a small difference between the calculated values, since the reliability of the basic score 20 calculated in the identification processing 18 is similar to that of the pattern score 17 calculated in the pattern matching processing 15, the average of the basic score 20 and the pattern score 17 is used as the overall score 22.

The overall score 22 is presented to the user through a user interface (UI) screen. According to the points of the overall score 20, the score is displayed in a different color. Since the displayed score is shown in a different color, the user can intuitively understand the shown result.

Figure 6:
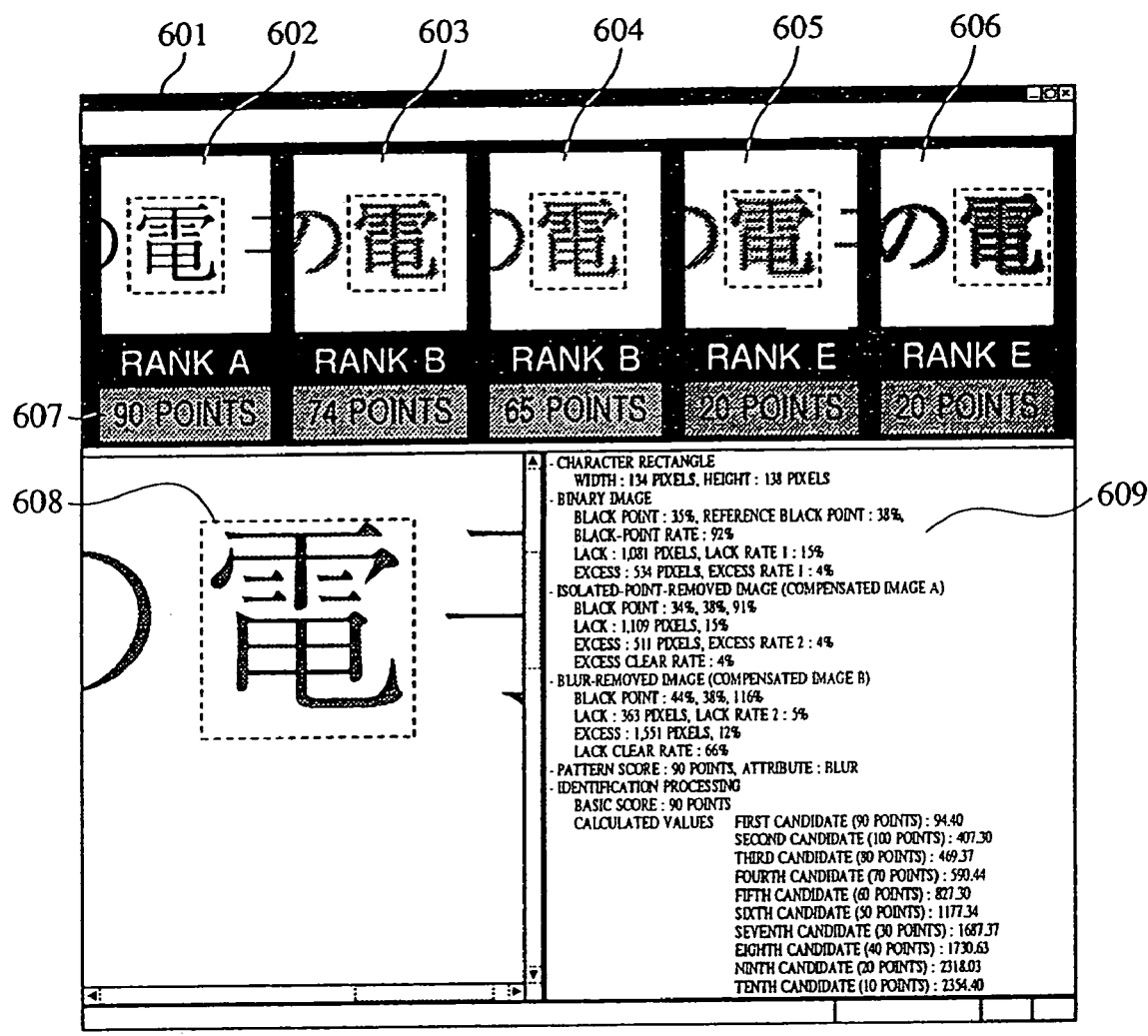
FIG. 6 is a view of a user interface display screen for illustrating the result of quality determination.

FIG. 6 shows an example UI screen indicating quality determination results. A determination-result display screen 601 indicates the results obtained by determination by the use of the test sheet shown in FIG. 5. The character images 502 to 506 to be determined are enlarged and displayed in windows 602 to 606. A line 607 indicates the quality score of each character image, and a very low score is indicated, for example, in red. The detailed evaluation results of each character image are shown in windows 608 and 609. When the user selects the character image 602, for example, the window 608 shows the image such that the result of pattern matching of the character image and a reference, or sample, pattern can be visually understood, in a way in which portions where both have black pixels, portions where only the character image has black pixels, and portions where only the reference pattern has black pixels are indicated by different colors. The window 609 shows detailed figures (such as pattern data calculated in the pattern matching processing 15, identification result 44 calculated in the identification processing 18, and attributes 16) calculated when the quality of the character image 602 is determined.

When the user instructs to save the calculated score as an evaluation score, data save processing 23 saves the overall score 22, the image data on the UI screen, the pattern measurement data, i.e., the black-point rate, the excess rate 1, the excess rate 2, the excess clear rate, the lack rate 1, the lack rate 2, and the lack clear rate, obtained in the pattern matching processing 15, attribute data such as thickness and thinness, a 400-dimensional feature vector having the amount of feature of the density gradient of the multi-value image obtained in the identification processing 18, and other data.

When the user feels that the calculated overall score 22 is clearly different from the subjective evaluation of the user, it is possible that the quality determination method is made to learn so as to obtain an evaluation which matches the subjective evaluation of the user. When the user issues an instruction for learning, dictionary-data registration processing 24 asks the user to specify a new score and attribute data for the character image; associates them with the pattern measurement data, i.e., the black-point rate, the excess rate 1, the excess rate 2, the excess clear rate, the lack rate 1, the lack rate 2, and the lack clear rate, obtained in the pattern matching processing 15 and registers them in the pattern dictionary; and associates with the 400-dimensional feature vector having the amount of feature of the density gradient of the multi-value image obtained in the identification processing 18 and registers in the identification dictionary. With such a learning function, when the quality of a character image similar to the character image is determined afterwards, an evaluation similar to the subjective evaluation of the user is obtained.

Figure 2:
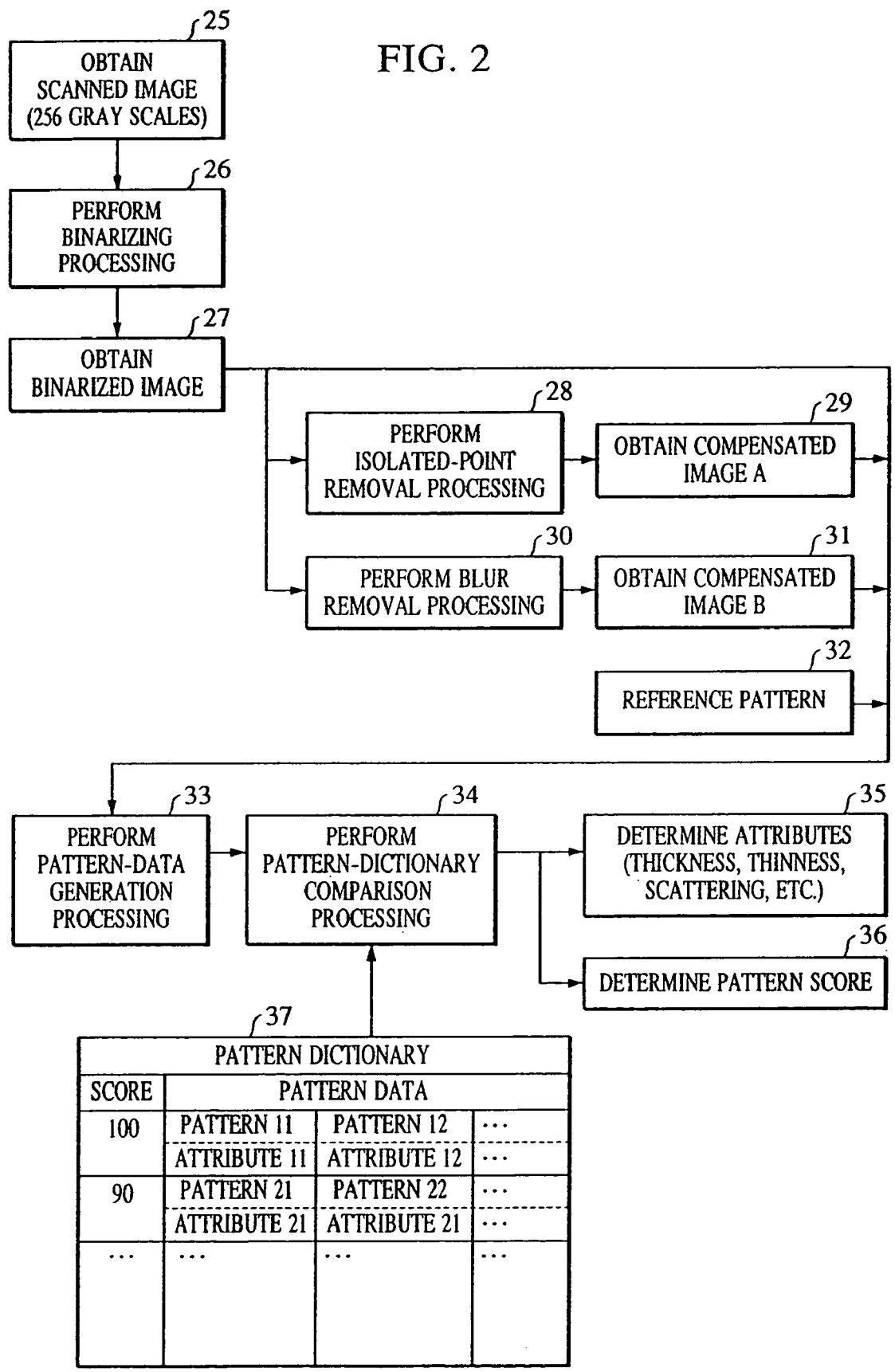
FIG. 2 is a detailed flowchart of pattern matching processing.

The pattern matching processing 15 shown in FIG. 1 will be described in detail by referring to FIG. 2.

A scanned image (having 256 gray scales) 25 has a character image data having 256 gray scales, obtained in the image-position detection processing 14.

Binarizing processing 26 binarizes the scanned image 25 to obtain binary image 27. A binarizing threshold is used in binarizing processing 26 which makes the original-data loss a minimum, such that a character image disposed in the 256-gray-scale scanned image is clearly expressed.

Isolated-point removal processing 28 is applied to the binary image 27 to obtain compensated image A 29. In the isolated-point removal processing, a cluster of black pixels having the number of black pixels smaller than a predetermined number is detected and removed.

The blur removal processing 30 is applied to the binary image 27 to obtain a compensated image B 31. In the blur removal processing, a portion determined to be a white pixel due to blur in the binarizing processing is detected and changed to a black pixel.

The reference, or sample, pattern 32 is an ideal pattern of the character to be evaluated in its style and size.

The pattern-data generation processing 33 applies pattern matching using the reference pattern 32 to each of the binarized image 27, the compensated image A 29, and the compensated image B 31 to obtain the pattern measurement data, i.e., the black-point rate, the excess rate 1, the excess rate 2, the excess clear rate, the lack rate 1, the lack rate 2, and the lack clear rate.

The black-point rate indicates the ratio of pixels where both the reference pattern 32 and the binary image 27 are black to those where the reference pattern 32 is black, and is obtained after pattern matching is applied to the binary image 27 and the reference pattern 32. The excess rate 1 indicates the ratio of pixels where the reference pattern 32 is white but the binary image 27 is black to those where the reference pattern 32 is white, and is obtained after pattern matching is applied to the binary image 27 and the reference pattern 32. The excess rate 2 indicates the ratio of pixels where the reference pattern 32 is white but the compensated image A 29 is black to those where the reference pattern is white, and is obtained after pattern matching is applied to the compensated image A 29 and the reference pattern 32.

The excess clear rate indicates the ratio of black pixels of which the excess is cleared in the isolated-point removal processing 28, and is obtained from the excess rate 1 and the excess rate 2. The lack rate 1 indicates the ratio of pixels where the reference pattern 32 is black but the binary image 27 is white to those where the reference pattern 32 is black, and is obtained after pattern matching is applied to the binary image 27 and the reference pattern 32. The lack rate 2 indicates the ratio of pixels where the reference pattern 32 is black but the compensated image B 31 is white to those where the reference pattern 32 is black, and is obtained after pattern matching is applied to the compensated image B 31 and the reference pattern 32. The lack clear rate indicates the rate at which blur is cleared in the blur removal processing, and is obtained from the lack rate 1 and the lack rate 2.

Pattern-dictionary comparison processing 34 compares the pattern measurement data obtained in the pattern-data generation processing 33 with those associated with patterns stored in the pattern dictionary 37 to find the pattern in the pattern dictionary 37 having the smallest difference, and determines the pattern score 36 and the attribute 35 associated with the pattern.

Pattern measurement data is obtained in advance from a plurality of learning character images (sample images); and the scores, attributes, and pattern measurement data of the learning character images are associated and stored in the pattern dictionary. With the use of such a pattern dictionary, the score 36 and the attribute 35 corresponding to the pattern measurement data obtained in the pattern-data generation processing 33 are obtained. The pattern dictionary may have any number of levels of scores. It can be very troublesome for the user to specify scores finely when generating the pattern dictionary. Therefore, it is recommended, for example, that the pattern dictionary 37 should store 11-level scores (if the best score is 100 points, for example, scores separated by intervals of 10 points).

Figure 3:
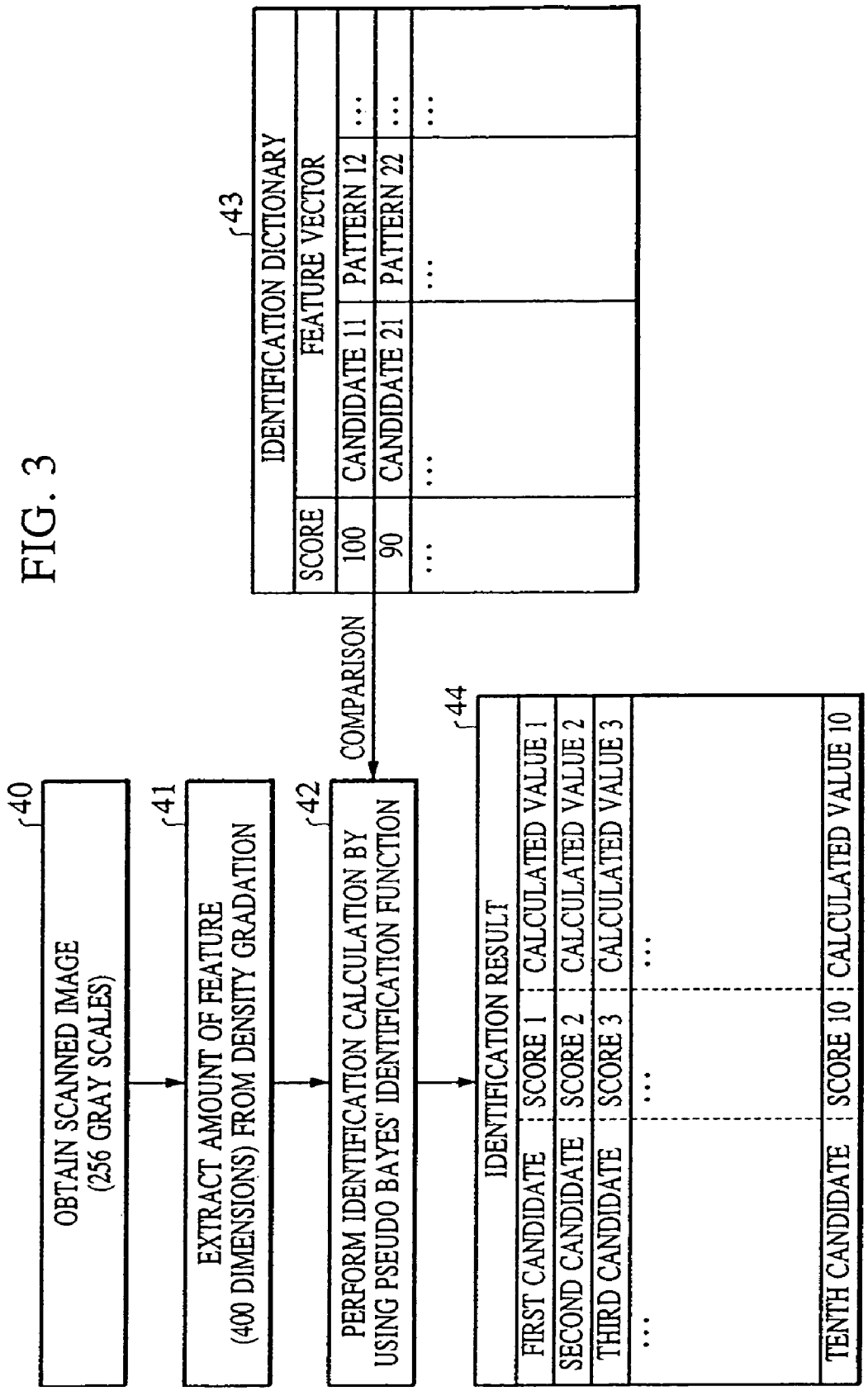
FIG. 3 is a detailed flowchart of identification processing.

The identification processing 18 shown in FIG. 1 will be described next in detail by referring to FIG. 3.

A scanned image (having 256 gray scales) 40 has character image data having 256 gray scales, obtained in the image-position detection processing 14. In step 41, density-change information is extracted from the multi-value scanned character image as the amount of feature having 400 dimensions.

The amount of feature having 400 dimensions, extracted from the density-change information of the multi-value character image will be described. As image pre-processing, a circumscribed frame and the center of gravity of the character image are obtained to apply normalization in position and size. Smoothing processing is applied to the normalized image several times by using 2-by-2 averaging filter to obtain a shaded image.

A Roberts filter is applied to obtain the direction and strength of the curved-surface gradient of the density of the shaded image, and the obtained direction of the gradient is quantized in 32 directions. The circumscribed frame of the character image is divided into 9 by 9, a total of 81, blocks, and the strength of the gradient in each of the 32 quantized directions is added in each block to obtain a local directional histogram. The histogram is multiplied by a weighting filter to obtain a histogram in which the dimensions are reduced from 32 directions to 16 directions.

A two-dimensional 5-by-5 gaussian filter is applied to the histogram in every other block horizontally and vertically to perform re-sampling to reduce the number of blocks to 5 by 5, a total of 25, blocks. Since each of the 25 blocks has the amount of feature having 16 dimensions, the amount of feature (feature vector) having 16-by-25, a total of 400, dimensions is obtained.

In step 42, the pseudo-Bayes' decision function is used to compare with the identification dictionary 43 to obtain a calculated value (measured by distance, so that the smaller the value is, the more similar they are) indicating similarity; and generates a first candidate to a tenth candidate in ascending order of the magnitude of the calculated values, which are the results 44 of identification.

The identification dictionary 43 is generated in advance by using a great number of learning character images (sample images) of the Japanese character den, 電. In the identification dictionary 43, the feature vector obtained from each learning character image is associated with the score of the learning character image and stored. Therefore, in step 42, the score and calculated value of each candidate can be obtained by the pseudo-Bayes' decision function. The identification dictionary 43 may have any number of levels of scores. It can be very troublesome for the user to specify scores finely when generating the identification dictionary. Therefore, it is recommended, for example, that the identification dictionary store 11-level scores (if the best score is 100 points, for example, a scoring interval of 10 points may be used) in the same way as in the pattern dictionary. It is preferred that a plurality of testees be asked to write scores for learning character images in advance to obtain statistical data, and the identification dictionary 43 be generated according to the score of each learning character image.

Generally, it was found from an experiment that 20 learning character images for each level of score (a total of 220 learning character images) were considered to be sufficient for a precise determination when they were registered in the identification dictionary 43. However, the number of character images registered in the identification dictionary 43 is not limited to 220. Since the number may vary from character image to character image, it is preferred that an experiment be conducted for a character image to identify the appropriate number for a given image.

Figure 4:
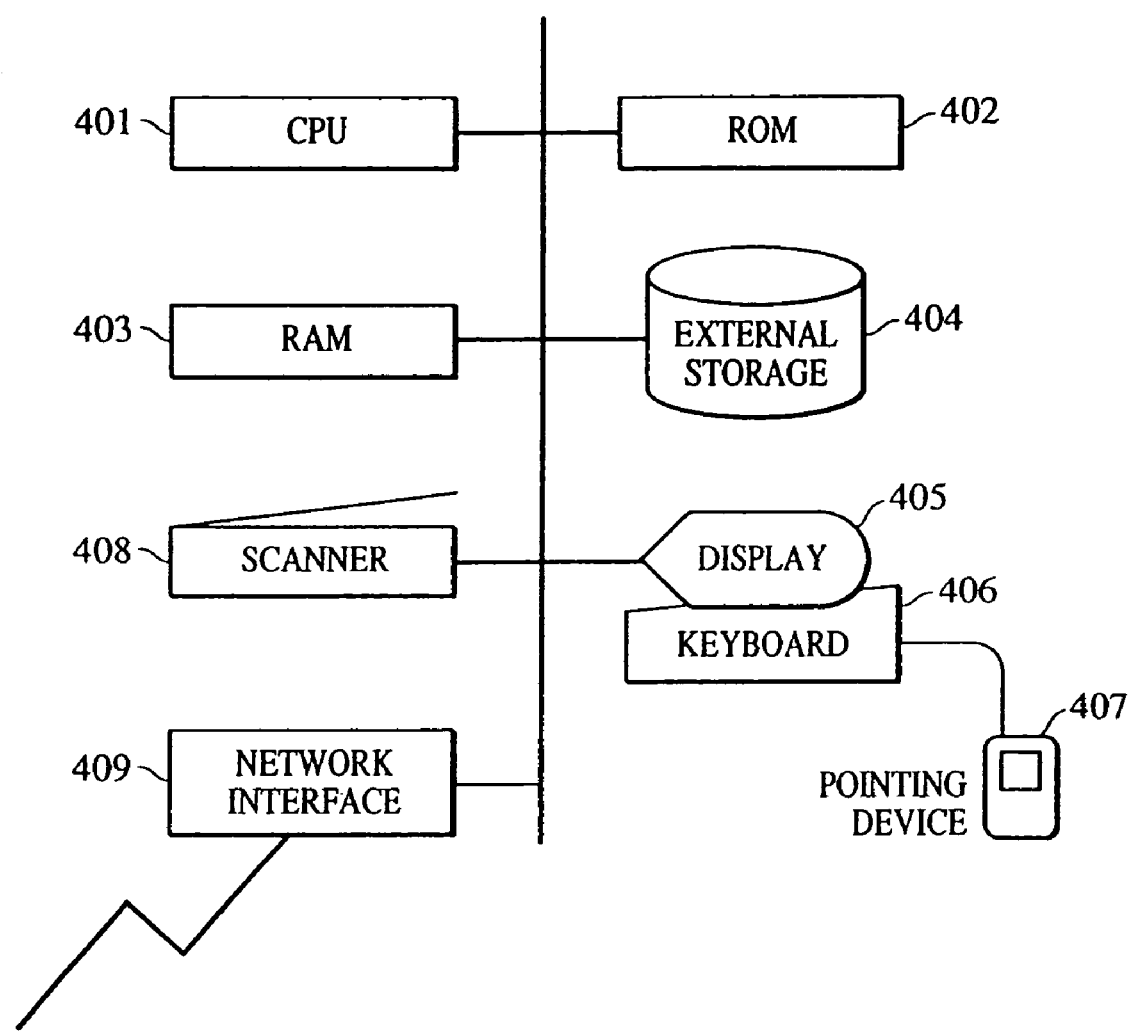
FIG. 4 is a block diagram of a quality determination apparatus.

FIG. 4 is a block diagram of an image-quality determination apparatus for determining the quality of an image, according to the present embodiment.

A CPU 401 controls the apparatus according to a control program stored in a ROM 402. The ROM 402 stores a program for controlling the CPU 401 to execute the processing to evaluate image quality according to the present invention such as is described in FIG. 1 to FIG. 3. A RAM 403 is used as a working area which is used by the CPU 401 during processing, and stores read document image data. A storage apparatus 404 may be external or internal, and may include a magnetic disk or removal media such as a floppy disk or CD-ROM, etc. There are also shown a display 405, a keyboard 406, a pointer device 407 such as a mouse, and an image scanner 408 for reading an image on an original. A network interface 409 communicates with an apparatus (not shown) disposed at a remote location to read and write a program and data. In the present embodiment, the program may be stored in the ROM 402, may be stored in an internal storage medium, such as a hard disk, or may be stored in an external storage medium, such as a floppy disk or a CD-ROM, and read and executed, as required. Alternatively, the program may be received from an external apparatus through a network and executed. The scanner 408 may be built in the image-quality determination apparatus, or may be connected as an external apparatus (for example, in a form in which a flatbed scanner is connected to a personal computer). The scanner may be connected through a network.

OTHER EMBODIMENTS

In the identification processing 18, the feature vector having 400 dimensions is calculated from the density gradient information. The identification processing is not limited to this case. The amount of another feature or a feature vector having a different number of dimensions may be used for identification.

In the above-described embodiment, the Japanese kanji character den, 電, is used as a character to be evaluated. The character to be evaluated is not limited to this character. Other characters, such as a Japanese hiragana or katakana, or an alphanumeric character, may be registered in a dictionary and used. It is also possible that a symbol or a figure other than characters is used to determine image quality. When a testee is asked to evaluate a learning character image in advance to generate the identification dictionary, since it is easier to evaluate image quality if an image of a character which has a rather complicated shape or which has a rather large number of strokes is used, the Japanese character den, 電, is used in the above embodiment. However, it should be apparent to one of ordinary skill that any character in any language may be used in conjunction with embodiments of the present invention.

In the above embodiment, the overall score is presented to the user with its best being set to 100 points. For example, the overall score may be converted to one of five ranks from A to E and presented to the user. In FIG. 6, the rank of each character image is shown with the overall score being converted to one of five ranks each having 20 or 21 points (rank A: 100 to 81 points, rank B: 80 to 61 points, rank C: 60 to 41 points, rank D: to 21 points, and rank E: 20 to 0 points).

It is preferred that the overall score be converted to one of ranks having not equal point intervals. When a strict evaluation is applied to rank A, for example, rank A corresponds to overall scores of 100 to 91 points, rank B corresponds to overall scores of 89 to 70 points, rank C corresponds to overall scores of 69 to 50 points, rank B corresponds to overall scores of 49 to 30 points, and rank E corresponds to overall scores of 29 to 0 points.

In the above embodiment, the result (overall score) of quality evaluation is presented to the user through the UI screen. The method of showing the result is not limited to this technique, however. A sound output or a printed output may be used to present the result to the user.

As described above, according to the embodiments, the result of determination does not change depending on the person who determines, unlike conventional cases. Image quality can be determined in a stable manner. In addition, since the user can understand the quality of an image by a number, the user can evaluate the image quality objectively.

Further, the learning function is also provided, it is possible by learning that an evaluation similar to the subjective evaluation of the user is performed. Learning also improves the precision of determination.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-quality determination method comprising the steps of:
    a pattern score calculation step of calculating a pattern score by comparing pattern measurement information stored in a pattern dictionary with pattern measurement information measured in a pattern matching processing that compares a image of an original with a sample image;
    a basic score calculation step of calculating a basic score by using an identification dictionary based on a result of an identification processing that compares a feature vector of the original image with a feature vector of a sample image;
    a score calculation step of calculating a quality score of the original image using both the calculated pattern score and the calculated basis score; and
    a presenting step of presenting the calculated quality score to the user.

2. An image-quality determination method according to claim 1, wherein, in said pattern score calculation step, the pattern dictionary, in which pattern measurement information of the sample image is associated with the pattern score, is used to apply pattern matching processing to the original image,
    and wherein, in said basic score calculation step, the identification dictionary, in which the feature vector of a sample image is associated with a score, is used to apply identification processing to the original image.

3. An image-quality determination method according to claim 1, wherein, in the pattern matching processing, the pattern measurement information obtained when the pattern of the original image and a pattern obtained by compensating the pattern of the original image are pattern-matched with the pattern of the sample image, is compared to the pattern measurement information stored in the pattern dictionary in order to calculate the pattern score.

4. An image-quality determination method according to claim 3, wherein the pattern measurement information includes a black-point rate, an excess rate, an excess clear rate, a lack rate, and a lack clear rate.

5. An image-quality determination method according to claim 1, wherein, in the identification processing, the feature vector is extracted from the original image having multiple values,
    the feature vector is compared to the feature vector of a sample image stored in the identification dictionary to obtain a predetermined number of candidates and to identify a first candidate having a better calculation result of comparison than other of the candidates, and
    the basic score is calculated according to the scores of the candidates.

6. An image-quality determination method according to claim 5, wherein, if there is a large difference between the calculated value of the first candidate having the better calculation result and that of a second candidate having a next best calculation result, the score of the first candidate is used as the basic score, and
    if there is a small difference between the calculated value of the first candidate and that of the second candidate, the average of the score of the first candidate and that of the second candidate is used as the basic score.

7. An image-quality determination method according to claim 5, wherein a difference between the calculated value of the first candidate obtained in the identification processing and the calculation value of an n-th candidate obtained in the identification processing, having a score similar to the pattern score obtained in the pattern matching processing is obtained,
    if the difference is large, the basic score is used as the quality score, and
    if the difference is small, the average of the basic score and the pattern score is used as the quality score.

8. An image-quality determination method according to claim 1, wherein the original image comprises a plurality of images extracted from the read image of the original,
    the quality score of each of the plurality of extracted images is calculated in the score calculation step, and
    control is made such that the quality score of each of the plurality of extracted images is presented to the user in the presenting step.

9. An image-quality determination method according to claim 1, wherein attribute information indicating the state of the original image is presented together with the quality score in said presenting step.

10. An image-quality determination method according to claim 1, wherein the quality score is presented in said presenting step with its color changed according to the magnitude of the quality score.

11. An image-quality determination method according to claim 1, wherein the user is made to specify a score for the original image, and the specified score is associated with information obtained from the original image and registered in a dictionary that comprises both the pattern dictionary and the identification dictionary.

12. An image-quality determination method according to claim 1, wherein the rank of the original image is presented to the user in said presenting step, the rank being determined according to the quality score calculated in said score calculation step.

13. An image-quality determination apparatus comprising:
a dictionary in which sample-image information is associated with a score indicating the quality of an image and stored, and which comprises a pattern dictionary and an identification dictionary;
pattern score calculation means for calculating a pattern score by comparing pattern measurement information stored in the pattern dictionary with pattern measurement information measured in a pattern matching processing that compares an image of an original with a sample image;
basic score calculation means for calculating a basic score by using the identification dictionary based on a result of an identification processing that compares a feature vector of the original image with a feature vector of a sample image;
score calculation means for calculating a quality score of the original image using both the calculated pattern score and the calculated basis score; and
presenting means for presenting the calculated quality score to the user.

14. An image-quality determination apparatus according to claim 13, wherein said score calculation means uses the pattern dictionary, in which pattern measurement information of the sample image is associated with the pattern score, to apply pattern matching processing to the original image, and wherein said basic score calculation means uses the identification dictionary, in which the feature vector of a sample image is associated with a score, to apply identification processing to the original image.

15. An image-quality determination apparatus according to claim 13, wherein the original image comprises a plurality of images extracted from the read image of the original, said basic score calculation means calculates the quality score of each of the plurality of extracted images, and
said presenting means controls such that the quality score of each of the plurality of extracted images is presented to the user.

16. An image-quality determination apparatus according to claim 13, wherein the user is made to specify a score for the original image, and
the specified score is associated with information obtained from the original image and registered in said dictionary.

17. An image-quality determination apparatus according to claim 13, wherein said presenting means presents the rank of the original image to the user, the rank being determined according to the quality score calculated by said basic score calculation means.

18. A storage medium readable by a computer having stored thereon an image-quality determination program comprising program code for causing the computer to execute the steps of:
a pattern score calculation step of calculating a pattern score by comparing pattern measurement information stored in a pattern dictionary with pattern measurement information measured in a pattern matching processing that compares a image of an original with a sample image;
a basic score calculation step of calculating a basic score by using an identification dictionary based on a result of an identification processing that compares a feature vector of the original image with a feature vector of a sample image;
a score calculation step of calculating a quality score of the original image using both the calculated pattern score and the calculated basis score; and
a presenting step of presenting the calculated quality score to the user.

* * * * *

UNITED STATES PATENT AND TRADEMARK OFFICE
CERTIFICATE OF CORRECTION

PATENT NO. : 7,113,620 B2  
APPLICATION NO. : 10/291426  
DATED : September 26, 2006  
INVENTOR(S) : Hiroyuki Shiotani It is certified that error appears in the above-identified patent and that said Letters Patent is hereby corrected as shown below:

<u>COLUMN 3</u>

Line 31, "is" should read --as--.

<u>COLUMN 5</u>

Line 55, "with" should read --them with--; and  
Line 58, "in" should read --them in--.

<u>COLUMN 9</u>

Line 6, "D: to" should read --D: 40 to--.

<u>COLUMN 12</u>

Line 28, "a image" should read --an image--.

Signed and Sealed this

Seventeenth Day of April, 2007

JON W. DUDAS  
*Director of the United States Patent and Trademark Office*